US005782177A

United States Patent [19]

Rindfleisch

[11] Patent Number: 5,782,177
[45] Date of Patent: Jul. 21, 1998

[54] ELECTROMAGNETIC ROLLER ARRANGEMENT

[75] Inventor: Hans-Jochen Karl Max Rindfleisch, Berlin, Germany

[73] Assignee: EMS Elektromagnetische Systeme GmbH, Korbussen, Germany

[21] Appl. No.: 737,326

[22] PCT Filed: Feb. 20, 1996

[86] PCT No.: PCT/DE96/00339

§ 371 Date: Oct. 20, 1996

§ 102(e) Date: Oct. 20, 1996

[87] PCT Pub. No.: WO96/26369

PCT Pub. Date: Aug. 29, 1996

[30] Foreign Application Priority Data

Feb. 22, 1995 [DE] Germany ............... 195 07 828.4

[51] Int. Cl.$^6$ ............... B30B 3/04; B30B 15/34
[52] U.S. Cl. ............... 100/334; 72/240; 425/3; 492/8; 100/168; 100/176; 100/917
[58] Field of Search ............... 100/155 R, 168, 100/176, 327, 917, 103, 334; 72/240; 425/3, DIG. 235; 492/8

[56] References Cited

U.S. PATENT DOCUMENTS

| | | |
|---|---|---|
| 3,456,582 | 7/1969 | McClenathan . |
| 4,062,097 | 12/1977 | Riihinen ............... 100/917 |
| 4,142,281 | 3/1979 | Müller ............... 100/917 |
| 4,290,353 | 9/1981 | Pav et al. ............... 100/168 |
| 4,485,540 | 12/1984 | Riihinen ............... 492/8 |
| 4,985,972 | 1/1991 | Sollinger et al. ............... 492/8 |
| 5,392,702 | 2/1995 | Suzuki ............... 100/168 |

FOREIGN PATENT DOCUMENTS

| | | |
|---|---|---|
| 0 021 297 | 1/1981 | European Pat. Off. . |
| 32 12 834 | 11/1982 | Germany . |
| 39 18 413 | 12/1990 | Germany . |
| 460 533 | 9/1968 | Switzerland . |
| 2 033 540 | 5/1980 | United Kingdom . |
| 2 058 246 | 4/1981 | United Kingdom . |

Primary Examiner—Stephen F. Gerrity
Attorney, Agent, or Firm—Collard & Roe, P.C.

[57] ABSTRACT

A roller arrangement has a magnetic circuit that includes two rollers. The magnetic circuit consists of a cylindrical magnetic core, several poles axially distributed on the magnetic core, a cylindrical exciter and control windings arranged between these poles, a magnetic shell that encloses the whole circumference of one roller and is made of two parts separated by a ring-shaped secondary air gap, and a continuous magnetic shell in the axial direction arranged at the outer circumference of the other roller. When used to process webs of material in the textile, paper, plastic and metallurgical industries, this electromagnetic roller arrangement achieves high quality standards with a high productivity.

18 Claims, 4 Drawing Sheets

ELECTROMAGNETIC ROLLER ARRANGEMENT

BACKGROUND OF THE INVENTION

1. Field of the Invention

The invention relates to an arrangement of rollers with parallel axes which can be adjusted to one another for creating pressing power which is evenly distributed along the length of the rollers for treating web-shaped materials.

2. The Prior Art

Such roller arrangements are known, for example, in the textile industry as foulards and in the paper industry as calenders. Furthermore, they are used in the leather-and plastics-processing industries and the field of metallurgy.

The design and operation of such roller arrangements involve difficulties in the production and maintenance of a pressing power in the roller's working gap which is constant or evenly distributed along the rollers' working width. This is caused primarily in that the entire required force is applied to the rollers at their shaft ends. As a result of the shaft being pressed together, the rollers bulge in opposite directions, the bulge being largest at its center. Therefore, the pressing power between the rollers decreases towards the center if appropriate preventative measures are not taken.

The technique of grinding the roller so that it is convex to compensate for the bulge is known. Apart from the extreme difficulties with regard to engineering which are involved, such a measure can achieve equal distribution of the pressure along the working gap at a certain pressure only. If the pressure is lower, the pressing power decreases near the center, meaning that it increases in the opposite direction.

This disadvantage can be avoided in a known way by constructing the roller as a hollow cylinder and providing it with a stationary shaft, a so-called stationary crosshead, upon which the ends of the hollow cylinder are mounted in such a way that it can rotate. The pressure is applied to the ends of the stationary shaft, whereby it bulges together with the hollow cylinder in the direction opposite to that in which the force is applied.

The bulge in the hollow cylinder is compensated in that the space between the stationary shaft and the hollow cylinder is divided into two longitudinal chambers. The chamber adjacent to the opposing rollers is filled with a pressurized medium which helps to create excess pressure in this chamber. As a result, this area of the hollow chamber bulges against the stationary shaft, thereby compensating the bulge created by the pressing power.

The seal of the pressurized chamber against the adjacent chamber in the circumferential direction, which is not pressurized, causes considerable difficulties during both production and operation of the roller, especially with regard to the seal at the point subject to sliding friction on the inner shell surface of the hollow cylinder. These difficulties are eliminated in a known way by separating the seal and support functions by evenly distributing hydraulic or pneumatic pressurized elements along the roller length between the stationary roller and hollow cylinder and near the pressurized chamber instead of a hydraulic fluid. These elements then act directly at the working gap, and therefore the line which is in contact with the opposing roller.

In this case also, however, the pressurized elements leak and signs of friction appear in the pressurized elements' support bearings on the inner shell surfaces of the rotating hollow cylinder in a number of different designs. As a result, costly and difficult maintenance work is necessary.

Therefore, various roller arrangements have become known which eliminate the disadvantage that the counterforces between the pressurized elements and the inner shell surface of the hollow cylinder are absorbed by a magnetic cushion, i.e., a magnetic field between the two magnets with opposite poles. Such a roller arrangement is described, for example, in the patent claim DE 391 84 13. Permanent magnets are preferably used in this case.

Roller arrangements are also known in which the inner counterforces are produced electromagnetically to compensate the deformation. This eliminates the need for an opposing bearing which transmits these forces from the stationary shaft to the hollow cylinder. This type of roller arrangement is described in the patent claim DE 321 28 34. In this case, the deformation is compensated evenly along the entire cross-section of the hollow cylinder so that a deformation in the circumferential direction can be avoided to a great extent. The stationary shaft is designed as a pole carrier, and the exciting windings which create the magnetic field are mounted on it. Because of the bulge in the shaft created by a load, a relatively great radial distance is required between the outer circumference and the inner shell surface of the hollow cylinder, as it must be ensured that there is absolutely no contact. In this arrangement, however, this radial distance corresponds to the air gap of the magnetic circuit through which the necessary magnetic flux and therefore the intensity of the required current in the exciting windings are determined at a given compensation force.

The disadvantage of this roller arrangement is that a disproportionately large amount of power is required to create the magnetic field. In addition, the radial dimensions and mass of the rollers are considerably increased by the radial thickness of the roller shell required for an effective magnetic yoke.

As with all return rollers, this arrangement also has the disadvantage that the pressure forces must be supplied via the outer bearings of the stationary shaft, which requires the use of relatively wide bearings and strong roller frames and therefore a great deal of material near the roller ends.

These disadvantages are eliminated with an electromagnetic press-roller, which is described in U.S. Pat. Ser. No. 3,456,582. In this case, both rollers which affect the working gap are included in the magnetic circuit, whereby the magnetic core with the exciting windings is located in one roller while the magnetic yoke is located in the other roller. The mass of the magnetic circuit is therefore distributed onto both rollers.

In this arrangement, the working gap between the rollers forms one part of the magnetic circuit. The size of this air gap is generally independent on the maximum potential load or the bulge in the roller shaft. This is due to the fact that such a bulge is no longer formed.

The pressure forces are no longer supplied to the working gap from outside via the roller bearing; they are in the air gap of the magnetic circuit and therefore created in the working gap itself along the entire width of the roller which is magnetically charged.

The pressure forces are therefore removed from the bearings, and their design must now take only the rollers' own mass and the driving power into account. A load applied to the rollers results in a reduction in the size of the air gap, due to the roller shell and the band-shaped material being pressed together, and therefore to an overall reduction in the amount of energy required for creating the magnetic field.

In the patent claim mentioned above, the magnetic circuit is divided into a number of axially adjacent, independent magnetic circuits. Excitation to varying degrees permits distribution of the pressing power along the working width of the roller as desired. On the other hand, this is limited by the fact that the magnetically effective air gap which determines the necessary exciting current in its entirety and therefore the power consumption and the mass of the exciting winding is the sum of the individual magnetic circuits factored by the field strength. The finer the desired setting of the pressing power along the working gap, the larger the number of individual magnetic circuits required, which increases the power required to create a certain effective mean of this pressing power. The same is true for the mass of the coil material, as each coil must be designed for the entire air gap flux.

The disadvantage of the roller arrangement according to U.S. Pat. No. 3,456,582 is primarily that, due to the construction of the individual magnetic circuits, the overall magnetic circuit must consist of a number of axially adjacent and independent individual magnetic circuits, so that a disproportionately large amount of power is required to create a pressing power which is constant along the working gap. In addition, solely a part of the magnetic material is utilized, namely in the magnetically active zone of the roller circumference. This zone is located at the point where the magnetic flux passes through the air gap from one roller into the other. This active zone represents a more or less narrow circular sector on both sides of the working gap or the line connecting both rollers+ centers which is dependent on the ratio of the rollers' cross sections. Sections of the roller's circumference successively enter this active zone when the roller is in operation. Therefore, the magnetically conductive material must be dimensioned for the full magnetic load over the entire roller cross section. This requires a disproportionately large amount of material and a correspondingly large roller mass with regard to its longitude.

Summary of the Invention

The purpose of the invention is to considerably reduce the amount of material required for production and the power consumption during operation of an electromagnetic pressroller.

The object of the invention is to create an arrangement of the magnetic circuit which permits extensive utilization of the roller's magnetic material in the areas of the roller's circumferential area located outside air gaps' actual working zone. At the same time, controlling the air gap induction a long the working gap should be possible without requiring separate magnetic circuits which can be excited separately.

The magnetic shell surrounding the roller's circumference makes it possible for the magnetic flux which travels through the working air gap in the circumferential area of the active zone and creates the pressure at that point, to evenly distribute over the entire circumference of the roller while passing through the magnetic circuit from or to the exciting winding. This results in a relatively large bearing cross section of the magnetic conductor with a continuous and evenly distributed load and correspondingly reduces the amount of material required for creating the magnetic circuit.

When the means described in the dependent claims are used, the magnetic shell can be designed and constructed in such a way that the magnetic material can be utilized to a great extent and independently of its momentary position during operation of the rollers, and that the eddy current loss resulting from rotation of the rollers can be minimized.

Subdividing the magnetic circuit into several parallel branches with the aid of several flange-shaped legs permits an even axial distribution of the flux from the excitation coil over the magnetic shell. The inner circumferences of the flange-shaped legs are connected to the magnetic core, while their outer circumferences are connected to the magnetic shell so as to be magnetically conductive for this purpose.

Varying the magnetic field intensity along the roller's working gap is possible without additional separate magnetic circuits. This is done by providing relatively low-power control windings between the legs of parallel branches of the magnetic circuit. Said control windings are then used to feed a magnetic flux into the magnetic circuit towards or away from the excitation winding, depending on whether the field intensity is to be increased or decreased along the working gap to the edges of the roller. The magnetic shell is provided with an annular air gap, which is not wider than the working air gap, in the area between two magnet legs, where a shunt winding is located, for creating variable induction which is evenly distributed along the axis of the working air gap. The result is that the flux from the shunt winding can effect the desired increase or decrease as a secondary flux in the working air gap. At the same time, this divides the magnetic flux onto the magnetic shell in such a way that a certain section of the magnetic shell is permanently allocated to each feeding magnet leg. This division of the flux permits optimum utilization of material and minimizes the driving power required for excitation.

The magnetic circuit magnetically connects the roller arrangement's two rollers, which are mechanically separated by the working gap. In its basic form, the magnetic circuit comprises an active and a passive section between which the working air gap is located. The active section is located inside the roller, which contains the exciting winding. It comprises the magnetic core surrounded by the exciting winding, the flange-shaped magnet leg and the magnetic shell which is divided into two pole surfaces of opposite polarity by the annular secondary air gap which is radially located over the exciting winding.

The passive section is located inside the roller which does not contain an excitation coil. This section comprises an axially continuous magnetic shell which creates the magnetic yoke between the two pole surfaces of the active section.

The entire magnetic flux from the pole surface on the one side of the annular secondary air gap enters from the magnetic shell of the active section through the working air gap and into the magnetic shell of the passive section. It then passes through the magnetic yoke to the other side of the annular secondary air gap. From there, it travels through the working air gap again and enters the other pole surface of the magnetic shell of the active section of the magnetic circuit. Therefore, the entire length of the working air gap, which extends over the entire working width of the rollers, is subjected to a flux in two adjacent sections and in an opposite direction only once. The air gap width, which affects the entire driving power, therefore amounts to twice the width of the geometric air gap, in contrast to the known arrangement. The longitudinal subdivision of the working air gap into several sections and their allocation to independent magnetic circuits requires several times the driving power required according to the invention.

In certain cases, especially in the event of cooling problems, designing the second roller as an active roller can be advantageous. This will not affect the driving power, though it could then be divided equally between the two rollers. In this case, the magnetic circuit comprises two partial circuits with opposite polarity which are magnetically joined in series.

In addition to the energy required for the driving power, the power consumed by this roller arrangement is determined by eddy current losses caused by induced voltages in all electrically conductive parts of the roller construction in which the magnetic field travels when the rollers are in operation or which move in relation to the magnetic field.

In accordance with the known construction rules, the eddy current losses are reduced to an acceptable level by the use of thin metal sheets or plates which are electrically insulated from one another for construction of the affected parts. The metal sheet or plate level is arranged in such a way that it corresponds to the level fixed between the two directions of the relative speed of the movements and of the magnetic flux. At the same time, the mutual movements of the components considered and the field vector within it must be included in the determination of the speed vector.

The direction of the flux vector is axial, radial or tangential in the various areas of the magnetic circuit. Several levels extending in an axial, radial or tangential direction are available for constructing the individual components made of layers of magnetic material which are insulated from one another. With this embodiment of the magnetic circuit, constructing the magnetic shell of two coaxial, radially adjacent cylinders has proven to be advantageous.

When the conventional material is employed, the inner cylinder serves to distribute the magnetic flux, while the outer cylinder assumes the task of feeding the magnetic flux to the working air gap, whereby the magnetic flux travels primarily in a tangential and radial direction.

The inner cylinder of the magnetic shell is wound of web- or band-shaped electrically insulated material, whereby the electrical insulation does not comprise non-magnetic material. As a result, the magnetic flux in this area travels primarily in the axial direction. The flux is directed in the radial direction onto the outer cylinder of the magnetic shell in the radially outer zones of the inner cylinder only. In addition to the axial direction of the flux, the arrangement of the web-shaped insulated magnetic material which is wound into layers, considerably suppresses eddy currents and the excitation losses they cause. The cylindrical, curved webs lie precisely at the level fixed by the directions of the speed and the magnetic flux. It is assumed in this case that the magnetic flux can be considered stationary in its position and that the inner cylinder of the magnetic shell rotates.

The magnetic flux radially enters the outer cylinder of the magnetic shell along the outer shell surface of the inner cylinder. The outer cylinder is constructed of thin, annular disks which are electrically insulated from one another and layered in axial levels. The electrical insulation consists of a non-magnetic material. This layered construction of the outer cylinder ensures that the magnetic flux is fed to the working air gap in a radial and a circumferential direction; at the same time, the magnetic shell is utilized evenly. Furthermore, a transverse magnetic flux is largely suppressed.

At the transition between the inner and outer cylinders and near the active zone, the flux travels in the radial direction and in the circumferential direction in the intermediate area. Therefore, the insulated annular disks are on the level fixed by the directions of the magnetic flux and the speed so that the flux not only distributes the flux evenly, the eddy current losses are also minimized. In this case also, it is assumed that the magnetic field can be considered stationary and that the outer cylinder of the magnetic shell rotates.

On the outer shell surface of the radially inner cylinder, the intensity of the magnetic field points in the radial direction. For this reason, an electrical voltage is induced here with a field intensity which lies in the axial direction. However, this voltage is not minimized through electric division of the effective induction lengths into electrically insulated sections. Rather, its full intensity is applied between the ends of the sheet metal bands wound into a cylindrical shape. As long as these voltages are equal throughout the circumference, they will be unable to drive a current and therefore harmless. This also applies to some extent to each winding of the material. However, the voltages differ from sheet metal winding to sheet metal winding, as the radial components of the magnetic field intensity decrease in the radially inward direction. Equalizing currents are driven between the sheet metal windings as a result of these differences, which produces additional power losses and simultaneously disturbs the even distribution of the flux.

Constructing the radially inner cylinder of the magnetic shell of cylindrical shells which are electrically insulated from one another and which are arranged adjacently in the circumferential direction and in several vertical layers in the radial direction can be advantageous for suppressing these equalizing currents.

In this case, the cylindrical gap over the radially inner cylinder can be designed as a bandage which presses the cylinder shells together so that they interlock.

A part of the flux is lost through the annular secondary air gap between the two parts of the magnetic shell of the active roller for production of the pressure. This loss can be minimized by a secondary air gap of appropriate size. As a result, effective lengths of the working air gap length are lost. Therefore, increasing the distance between the sheet metal disks of the radially outer cylinder of the magnetic shell towards the secondary air gap can be advantageous. This reduces the magnetic shunting potential of the outer cylinder of the magnetic shell towards the secondary air gap and therefore effectively suppresses an excessively large exit of transverse magnetic flux.

A stationary magnetic field is required only for roller arrangements in which the exciting winding itself does not rotate. For example, this is the case with a roller with a stationary crosshead upon which the magnetic shell is mounted in such a way that it can swivel and on which the exciting winding with the magnetic core and the flange-shaped magnet legs are located in such a way that they cannot twist.

If the exciting winding rotates, the magnetic field rotates with it.

Each closed flux element is linked to a certain circumferential element of the exciting winding and follows it through the magnetic circuit. One can assume that a relative movement between the magnetic flux vector and roller components and therefore the induction of eddy currents is impossible wherever the flux is radially symmetrical. This also applies to all embodiments of the roller arrangement for the magnetic core and the flange-shaped magnet leg according to the invention.

In an especially advantageous embodiment of the roller arrangement, this is also achieved for the inner cylinder of the magnetic shell. For this purpose, a cylindrical gap of non-magnetic material, the width of which is relatively narrow compared to the working air gap, is provided between the radially inner and the radially outer cylinder of the magnetic shell.

This ensures radially symmetrical distribution of the flux at the transition between the two cylinders of the magnetic shell, which produces a constant flux intensity around the entire circumference, the vectors of which point exclusively in the radial direction. In this arrangement, not only the magnetic core can also consist of solid ferromagnetic material together with the flange-shaped magnet legs, the same is true of the inner cylinder of the magnetic shell.

In the radially outer cylinder of the magnetic shell, the flux element does not change its axial position when the roller is in operation due to the even axial flux distribution in the cylindrical gap. It solely changes the position of its path in the circumferential direction, from radially outward to radially inward, when the circumferential element of the exciting winding linked to it moves toward the active zone of the roller arrangement, and therefore the working air gap. When this occurs, the flux element at the circumference simultaneously travels toward the center of the active zone from the edge. As a result of these relative movements of the field intensity vector, voltages with electrical field intensity vectors which point in the axial direction are induced in the outer cylinder of the magnetic shell. However, the formation of eddy currents is effectively prevented by the axial layering of the magnetic material.

The electrical insulation between the magnetic sheets of the radially inner cylinder of the magnetic shell, normally non-magnetic, causes an increase in the effective magnetic air gap on the flux's path into the cylindrical gap as the distance from the feeding magnet leg increases. The resulting decrease in the radial flux density in the radial direction can be countered by correspondingly reducing the wall thickness of the cylindrical gap in this direction. However, using a magnetically conductive material, e.g., a suitable metal oxydene, for the electrical insulation of the sheet can be advantageous with a cylindrical gap.

If the cylindrical gap between the cylinders of the magnetic shell is not to be included, even flux distribution in the circumferential and axial directions can be ensured by constructing the radially inner cylinder of strip-shaped metal sheets which are electrically and magnetically insulated from one another and which are layered in the circumferential direction. The production of fully effective induced voltages is possible in this case. However, they drive circular currents at the sheet level which travel in the direction opposite that of the sheet's rotation. Appropriately dimensioned sheet strips, especially an electrically effective though magnetically unimportant division of the sheet strips into several axial sections of varying length, can ensure that the effectiveness of the induced voltages is effectively eliminated.

Apart from the travel in the radial and circumferential directions, the magnetic field intensity vector does not move. The magnetic field therefore has the outward appearance of a rotational field (relative to a stationary point in space). At the same time, the rotational speed of the field intensity vector near the active zone is considerably lower than that of the roller, so that the field can almost be considered stationary. This fact can be used advantageously when the passive roller is provided with a two-part magnetic shell with a stationary inner cylinder. A cylindrical gap is located between the two cylinders. The outer cylinder is mounted on the inner cylinder in such a way that it can rotate. The latter is supported by a stationary crosshead.

In this case, only the inner cylinder of the magnetic shell functions as a magnetic yoke. As the magnetic field can be considered more or less stationary, it can consist of solid ferromagnetic material. The outer cylinder transmits the magnetic flux to the working air gap and creates the pressure between the rotating rollers. When rotating in a nearly stationary air gap field, a voltage with an electrical field intensity vector which points in the axial direction is created.

The eddy currents can be effectively suppressed through both axial layering and layering in the circumferential direction. Both the construction of the layers and the thickness of the outer cylinder's material can be determined according to exclusively mechanical considerations.

Constructing the outer cylinder of strip-shaped metal sheets which are electrically insulated from one another and which are layered in the circumferential direction can be advantageous when high flexural strength and deformation resistance of the roller shell are important.

This cylinder design includes an annular gap of non-magnetic material, such as in the axial center of the magnetic shell, which is narrower or at least the same width as the annular secondary air gap in the magnetic shell of the roller in the active magnetic circuit. As a result, the magnetic flux travels through the outer cylinder in the radial direction only, and a local overload of the magnetic material through additional axial flux units is impossible.

If the magnetic field can no longer be considered stationary because the circumferential speed of the field intensity vector is no longer negligible, the inner cylinder of the magnetic shell of the passive roller must also be provided with a layered construction to avoid eddy current losses. The layering must be made in the radial direction, as the field intensity vector points in the axial direction and travels in the circumferential direction. In this case, the inner cylinder is preferably wound with thin, electrically insulated sheet metal. Furthermore, designing the sides of the inner and the outer cylinders which face one another as coaxial cylinders and border one another in the shape of a cone along the entire magnetically effective pole side of the magnetic circuit is also preferable. This is done in such a way that the outer diameter of the inner cylinder increases as the flux increases and decreases as the flux decreases in the opposite direction on each of the two pole sides. This ensures the even distribution of the flux, especially at those spots at which the magnetic flux is diverted from the radial to the axial direction or vice versa. At the same time, the flux constantly travels parallel to the sheet metal layers to prevent additional eddy current losses. Furthermore, it is not necessary for the flux to travel through the non-magnetic electrical insulation of the sheet, by which an undesirable increase in the driving power is avoided.

The magnetic shell can be constructed in an especially simple way with a web- or band-shaped magnetic shell of extremely low electrical conductivity when a magnetically conductive insulation material is also employed. The electrical conductivity of the magnetic material is so low that the electrical voltages created in the layered level are unable to drive significant eddy currents. On the other hand, the magnetic conductivity of the electrical insulation must be so great that it offers no more than slight resistance to the magnetic flux transverse to the layered level which does not increase the driving power significantly. Amorphous magnetic material, so-called glass-metal, possesses the desired electrical qualities and is produced in thin bands by being quenched out of the molten mass. Various ferritic materials can be used as a magnetically conductive insulation material to coat the band-shaped magnetic material by means of vacuum metallization.

BRIEF DESCRIPTION OF THE DRAWINGS

The invention described in detail using the example of one embodiment. The drawings show the following.

DETAILED DESCRIPTION OF PREFERRED EMBODIMENTS

Figure 1:
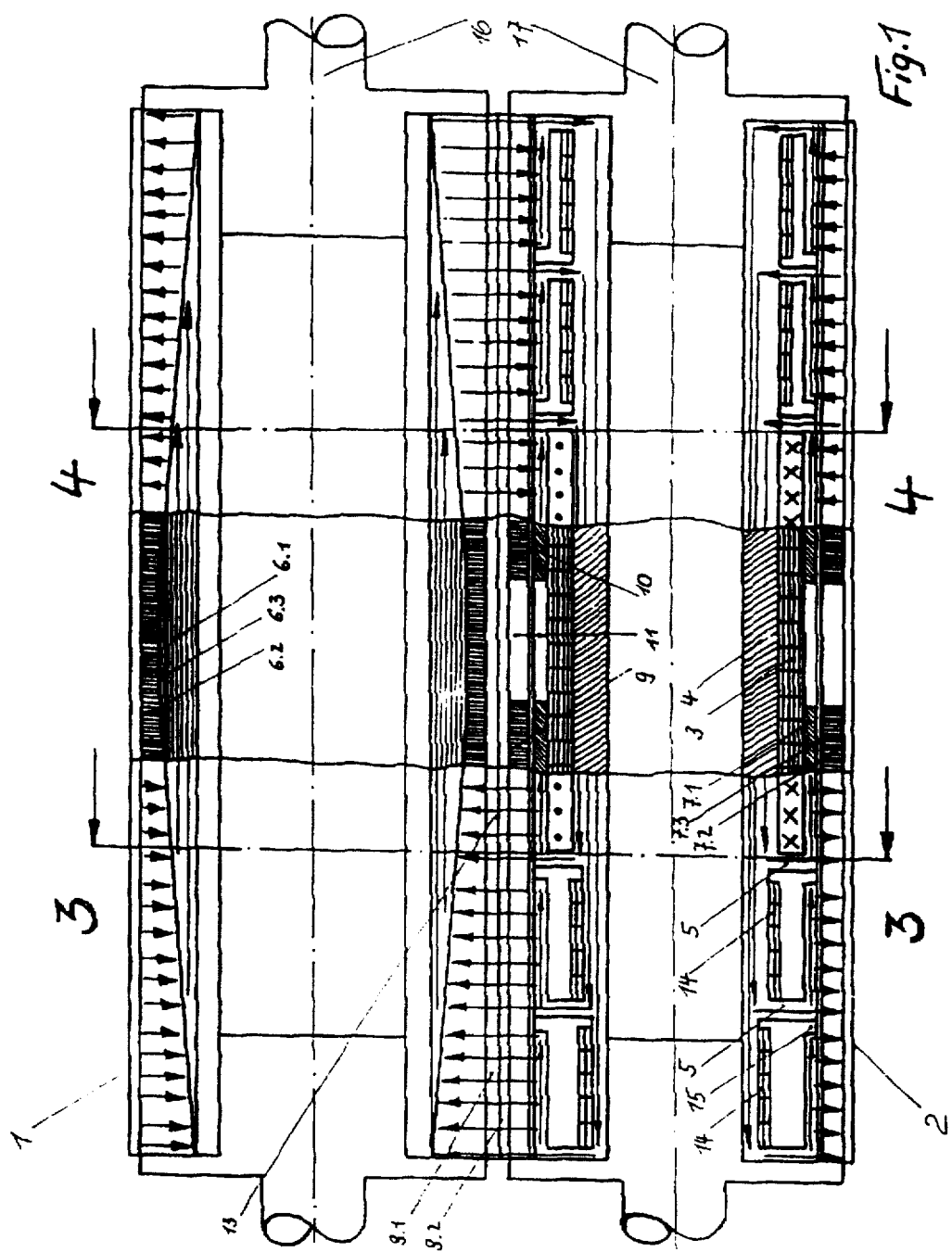
FIG. 1 shows the magnetic circuit and the flow diagram in a longitudinal view of the roller arrangement.

In the flow diagram, arrows indicate the direction of the magnetic flux on the plane of the drawing, and crosses and dots indicate the direction of the flux vertical to the plane of the drawing. A cross indicates a flux vector entering the plane of the drawing from above, while dots indicate a flux vector exiting the plane of the drawing vertically from below. The same applies to the vector of the electrical current density in the cylindrical exciting winding.

The electromagnetic roller arrangement comprises the magnetically passive roller 1, the magnetically active roller 2 with the cylindrical exciting winding 3 and the control windings 14. The rollers 1 and 2 are connected by the magnetic circuit of the roller arrangement in such a way that they can to roll off one another and are mounted at the shaft journals 16 and 17 so that they can be advanced towards one another.

In the arrangement according to the invention, the magnetic circuit comprises the cylindrical magnetic core 4 through which the flux travels continuously in one direction, the flange-shaped magnet legs 5 extending from the magnetic core and the cylindrical magnetic shell 7 on the side of the active roller 2, the magnetic shell 6 on the side of the passive roller 1 through which the flux travels continuously in one direction, and the active zone with the air gap 8 between the magnetic shells 6 and 7.

The air gap 8 is the actual working air gap in the magnetic circuit of the roller arrangement. An attraction is created between the rollers 1 and 2 in this air gap when the magnetic flux passes through, and this attraction tends to shorten the length of the flux's path through the air gap. This force exerts pressure on the working gap 13 of the roller arrangement. It is proportional to the square of the flux density and the cross-sectional surface of the air gap 8 in the symmetry level of the active zone α.

The working coatings 8.1 and 8.2 of the rollers 1 and 2, which are applied directly to the magnetic shells 6 and 7 in this embodiment, determine the electromagnetically active value of the air gap 8. The thicker the working coatings, the larger the amount of power which will be required to create the desired pressure.

In addition to the working air gap 8, additional air gaps are located in the magnetic circuit. These air gaps serve to distribute and divert the magnetic flux. A gap of non-magnetic material between two opposing surfaces of adjacent magnetic bodies will be hereafter termed an air gap.

The radial construction of the magnetic shell 7 of the active roller 2 comprises the radially adjacent coaxial cylinders 7.1 and 7.2 and the air gap 7.3 of constant width located between these cylinders. Two equal-sized magnetic shell parts 9 and 10 which are divided by the annular secondary air gap 11 in the axial construction of the magnetic shell 7 are the active poles of the magnetic circuit.

The magnetic core 4, the magnet leg 5 and the radially inner cylinder 7.1 of the magnetic shell 7 consist of solid ferromagnetic material. The outer cylinder 7.2 of the magnetic shell is constructed of annular metal sheets or plates which are electrically insulated from one another, axially layered and pressed or cemented together into a stable package.

The magnetic shell 6 of the magnetically passive roller is constructed of two radially and conically adjacent cylinders 6.1 and 6.2. The outer diameter of the radially inner cylinder 6.1 or the inner diameter of the radially outer cylinder 6.2 decreases from the edges to the center of the roller. An extremely narrow, conical air gap 6.3 is preferably located between the two cylinders.

The radially inner cylinder 6.1 is wound of band-shaped, electrically insulated magnetic material on a stay pipe 12 made of non-magnetic material. The radially outer cylinder 6.2 is constructed of annular metal sheets or plates which, similarly to the cylinder 7.2, are axially layered and pressed or cemented together.

The magnetic shell 6 of the passive roller forms the axially continuous magnetic yoke of the magnetic circuit, which completely covers the entire length and depth of the working air gap 8. This permits the formation of a air gap field which opposes the active poles of the magnetic circuit in the roller's longitudinal direction between the rollers and which is exactly the same size and constant along the magnetic shell parts (pole surfaces) 9 and 10. The pressure created by this air gap field in the working gap 13 between the rollers 1 and 2 per length unit is therefore also constant in the roller's longitudinal direction.

The pressure is not created "on-site" solely in the axial area of the secondary air gap 11. It must therefore be mechanically transmitted via the magnetic shells 6 and 7 and a bearing bridge which fills the secondary air gap 11 from the pole surfaces 9 and 10 to this axial area of the working gap 13. The exciting winding 3 is arranged symmetrically to the annular secondary air gap 11 in this area, i.e., in the axial center of the rollers 1 and 2, where it surrounds the core 4 cylindrically between two flange-shaped magnet legs 5.

This arrangement of the exciting winding permits a symmetrical construction of the magnetic field in the roller arrangement and an even distribution of the magnetic flux to the individual components.

The magnetic flux of the magnetic circuit is produced with the electrical current in the exciting winding. The magnetic electromotive force is thereby created, which drives the flux on its path through the magnetic circuit and is consumed as circulation voltage. Due to the high permeability of the magnetic material, the circulation voltage decreases only on those sections of the path which pass through the air gap. As a result, constant magnetic potentials of varying intensity form on the opposing boundary surfaces of the air gap. Therefore, the magnetic field intensity remains constant along an air gap. The magnetic flux must always distribute evenly along air gaps for this reason.

Figure 2:
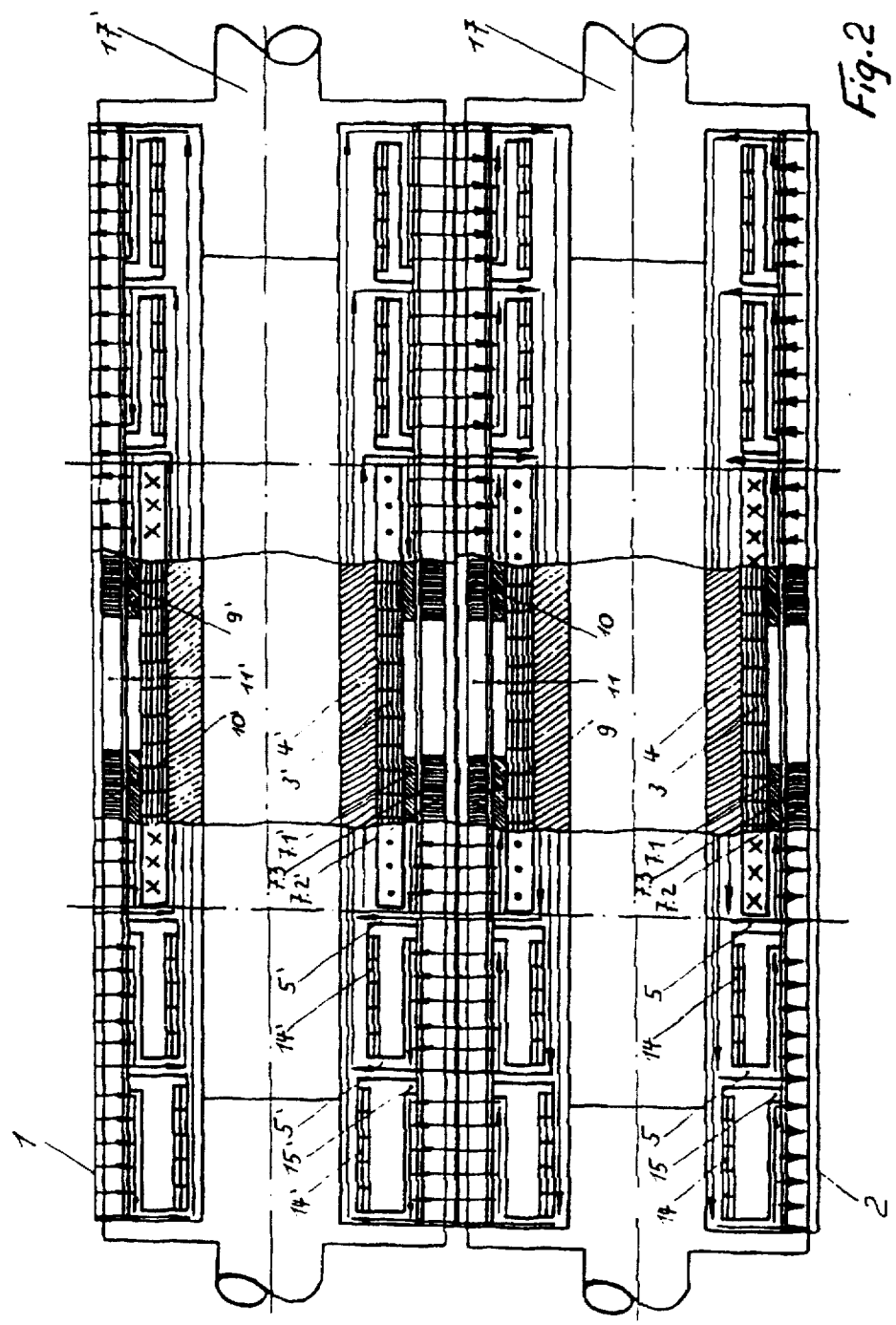
FIG. 2 shows the magnetic circuit and the flow diagram in a longitudinal view of the roller arrangement.
Figure 3:
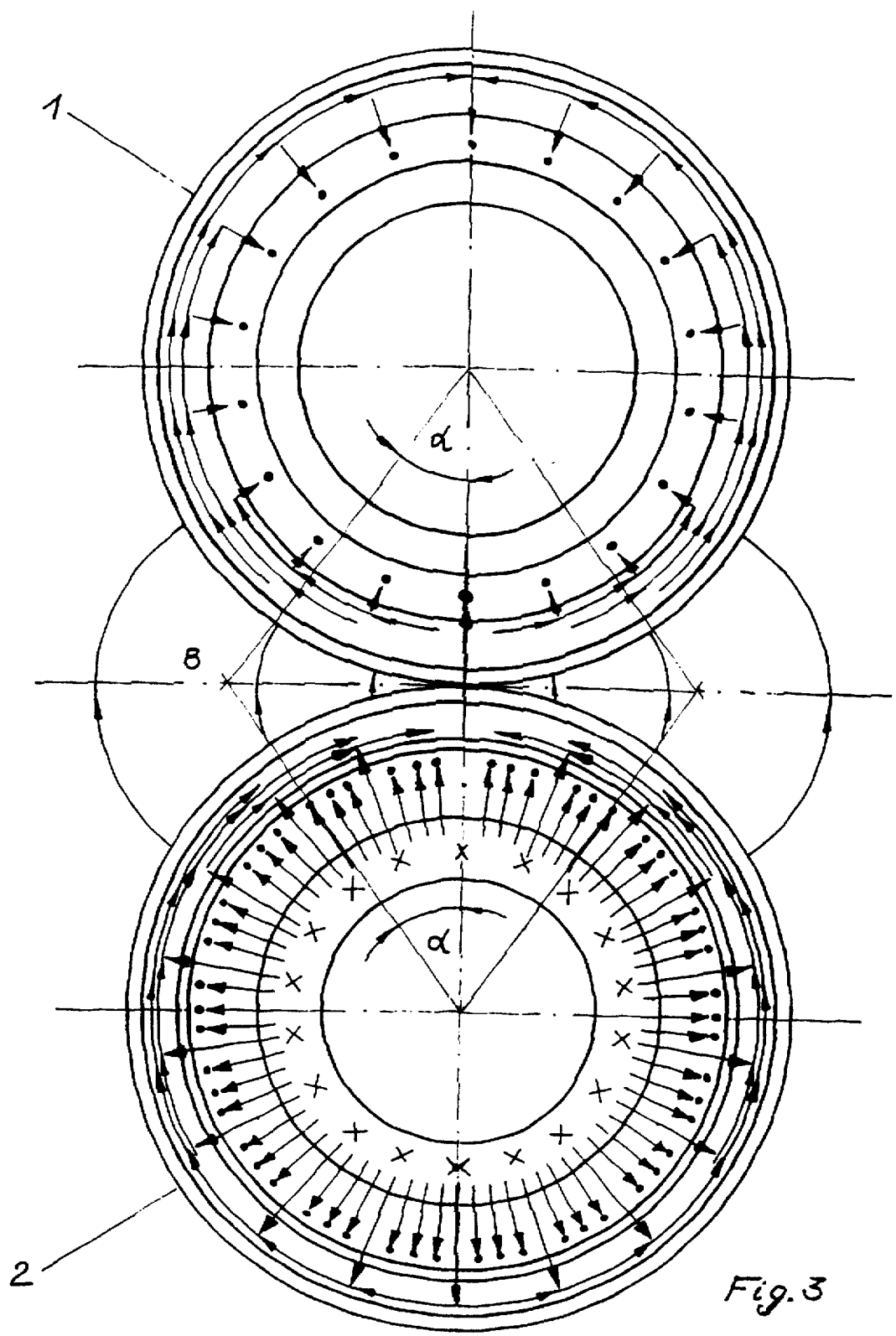
FIG. 3 is a section view along line 3—3 of FIG. 1.
Figure 4:
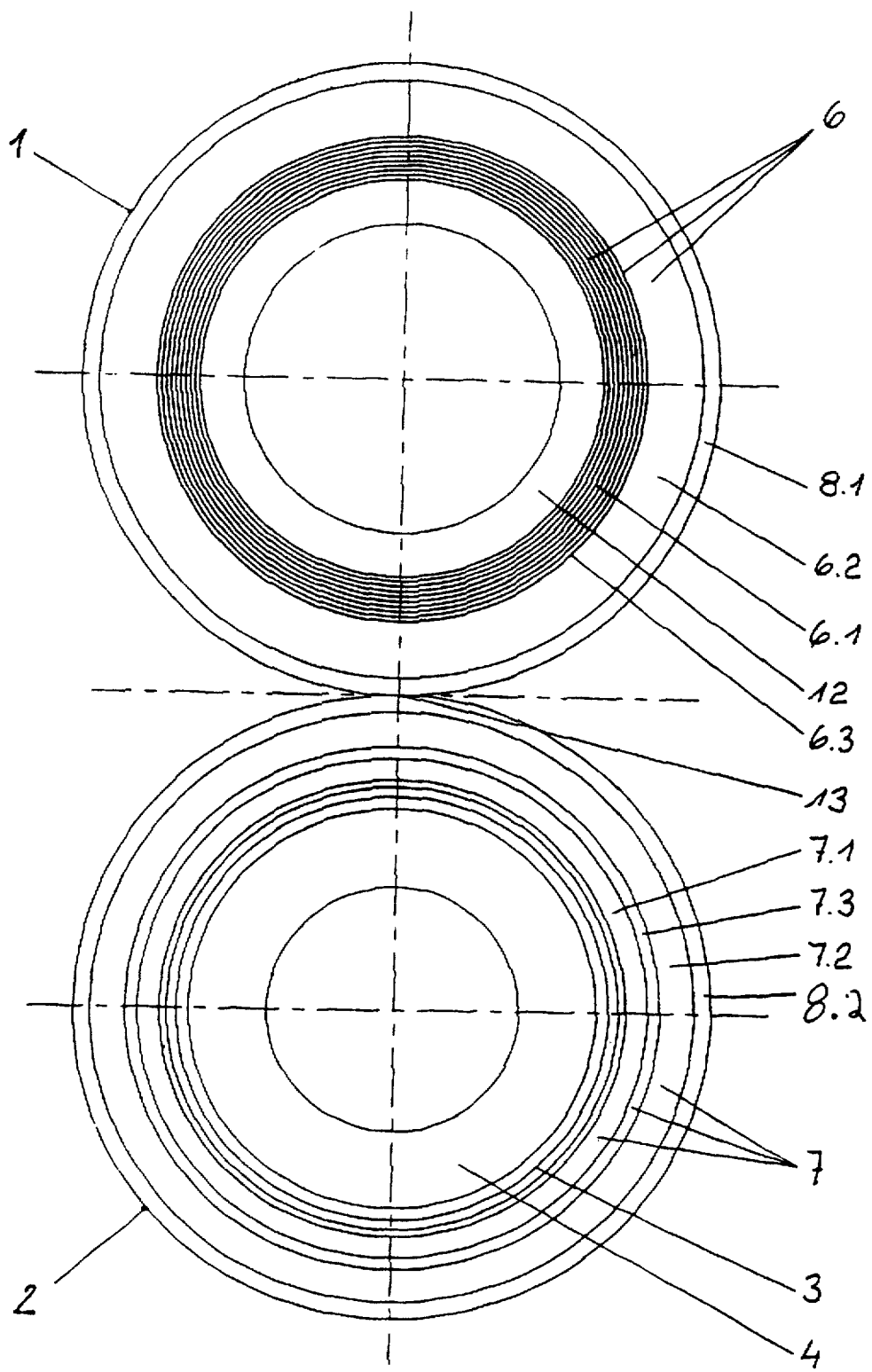
FIG. 4 is a section view along line 4—4 of FIG. 1

The flux distribution in the magnetic circuit according to the invention is shown in diagrams in FIG. 1 and FIG. 2 in a longitudinal view and in FIG. 3 and FIG. 4 in a cross section of the roller arrangement. The bundled magnetic flux in the magnetic core 4 exits the exciting winding 3 on one pole side and distributes evenly in the longitudinal direction onto the flange-shaped magnet leg 5. This even flux distribution is ensured by the cylindrical air gap 7.3 of the magnetic shell 7. The magnetic flux enters this gap through the inner cylinder of the magnetic shell, where it evenly distributes along the axis of the air gap according to the constant field intensity. At the same time, it is directed from the axial and into the radial flow direction.

The flux, which is evenly distributed over the entire shell surface of the air gap, now enters the outer cylinder of the magnetic shell where it is directed to the working air gap 8 of the magnetic circuit in the circumferential direction. When doing so, the flux density increases in the outer cylinder 7.2 of the magnetic shell 7 in the circumferential direction until it reaches the boundary area of the active zone α of the magnetic circuit. In the active zone α, the flux travels through the working air gap 8 in the magnetic shell 6 of the passive roller 1 at the active pole of the magnetic circuit created by the magnetic shell part 9.

In the outer cylinder 6.2 of the magnetic shell 6, the flux is directed in the circumferential direction. At the same time, the flux evenly distributes around the inner circumference of the outer cylinder 6.2 of the magnetic shell 6. Furthermore, it is directed to the inner cylinder 6.1 of the magnetic shell 6 in the radial direction. The flux enters the inner cylinder 6.1 of the magnetic shell 6 through the conical air gap 6.3. At the same time, it is directed out of the radial and into the axial flow direction. As a result of the entering fluxes from the outer cylinder 6.2, the flux increases towards the axial center of the magnetic shell 6. However, the outer diameter of the inner cylinder increases in the same direction, meaning that flux density and material load remain constant.

On the other half of the magnetic shell 6, the flux decreases in the inner cylinder 6.1 as a result of the radial exiting fluxes in the outer cylinder 6.2 which are evenly distributed around the circumference. Accordingly, the outer diameter of the inner cylinder decreases towards the roller end.

In the outer cylinder 6.2, the flux radially exiting the inner cylinder 6.1 through the conical air gap 6.3 in the circumferential direction is directed to the active zone α. From there, it reenters the magnetic shell 7 of the magnetically active roller 2 through the working air gap 8 at the active pole of the magnetic circuit formed by the magnetic shell part 10. The flux from the outer cylinder 7.2, while simultaneously distributing evenly to all affected components, travels through the cylindrical air gap 7.3 and over the inner cylinder 7.1 and the flange-shaped magnet leg 5 back into the magnetic core 4, where it closes off all the circulation paths of all fluxes. As the magnetic flux in the magnetic core decreases in intensity by the value of the entering or exiting radial fluxes as the distance from the exciting winding behind each of the flange-shaped magnet legs 5 increases, the cross section of the core 4 which directs the flux can be gradually tapered towards the ends of the rollers 2 analogously to the inner cylinder 6.1 of the magnetic shell 6. As shown in FIG. 1 on one half of the active roller, this considerably improves efficient utilization of the core material and considerably reduces the mass of the magnetic core.

Control windings 13 which are excited in the direction opposite that of the exciting winding have been provided for the event that the magnetic field intensity is to be changed in the working air gap 8 in the roller's longitudinal direction, e.g., to obtain a pressure which decreases in the working gap 8 of the rollers towards the roller ends. This creates a flux in the control winding in the direction opposite that of the exciting winding. A magnetic electromotive counterforce which is effective for the entire magnetic circuit can be created from this counterflux with the annular control air gap 15 provided in the inner cylinder 7.1 over each control winding 14. This control air gap is preferably at least twice as wide as the cylindrical air gap 7.3, though it is not wider that the working air gap 8. This reduces the driving magnetic electromotive force on each desired circulation path through the magnetic field which includes the control winding by the value of the counterflux. As a result, the magnetic field intensity in the working air gap is thereby reduced correspondingly in the axial area of the control winding, or more precisely, in the axial area between two control air gaps. The flux in the magnetic core is also reduced by a corresponding value. However, it does not change direction at any point as long as the counterflux of the control windings are not greater in intensity than the flux of the exciting winding.

I claim:

1. An electromagnetic rolling device comprising a frame made of non magnetic material;

two adjacent rollers predominantly made of ferromagnetic material, both of said rollers being pivoted within said frame so as to have a same axial direction, and being separated mechanically each from another at a non magnetic nip gap and connected magnetically each to another within a common magnetic circuit, wherein said magnetic circuit comprises at least one magnetic core being part of at least one of said rollers;

several flange shaped magnetic legs extending radially outwards from said core;

a magnetic yoke, which is constituted by the respective other of said rollers;

magnetizing coils wound on said core forming a solenoid for magnetizing said magnetic circuit, said magnetizing coils being disposed each between two of said flange shaped magnetic legs, said magnetizing coils being provided with separate terminals, which have means for being connected to an electrical current source, said magnetizing coils each being charged by an exciting current in one magnetically active direction so that said magnetic core is magnetized homogeneously, each in its own axial direction;

two magnetic shells, each of said shells being part of respective one of said rollers and extending in each case around the whole circumference of each said rollers, respectively, at least in sections of said rollers, which contain said magnetizing coils;

said magnetic shell of at least that roller containing said magnetizing coils being divided into two adjacent magnetic shell parts by a non magnetic annular by-gap, being considerably wider than said non magnetic nip gap but narrower than said magnetic shell parts, wherein said magnetizing coils are disposed axially or approximately symmetrical with regard to the magnetic field; and a non magnetic gap space having a width between said rollers.

2. The electromagnetic rolling device of claim 1, wherein each of said rollers comprises said magnetic core, said flange shaped magnetic legs, said at least one magnetizing coil, and said adjacent magnetic shell parts, radially adjacent magnetizing coils of said rollers each being charged by the exciting current in magnetically opposite direction, thus effecting said common magnetic circuit.

3. The electromagnetic rolling device of claim 1, wherein said magnetic core is fitted out with said magnetizing coil only at the axial middle of said roller between two of said flange shaped magnetic legs.

4. The electromagnetic rolling device of claim 1, further comprising at least two controlling windings of lower power for magnetic field strength variation axially along said non magnetic nip gap, being disposed axially at both sides of said magnetizing coil, said magnetizing coil placed in the axial middle of said roller and being a main winding for magnetic field generation;

wherein radially over each of said controlling windings always a non magnetic annular gap being a field controlling means is provided within said magnetic shell, said annular controlling gap being of a width up to the width of said non magnetic nip gap.

5. The electromagnetic rolling device of claim 1, wherein said magnetic shell is divided radially into two coaxially disposed cylinders, a radially inner one being wound out of band shaped electrically isolated ferromagnetic material and a radially outer one comprising annular disk shaped ferromagnetic sheets or plates, axially stacked together and electrically isolated each from another.

6. The electromagnetic rolling device of claim 5, wherein the electrical isolation between said annular disk shaped sheets or plates of said radially outer cylinder at least near said non magnetic annular by-gap comprising non magnetic material, said electrical isolation getting thicker from layer to layer in the direction of said non magnetic annular by-gap.

7. The electromagnetic rolling device of claim 5, wherein a non magnetic cylindrical gap is disposed between said radially inner and said radially outer cylinder of said magnetic shell so as to comprise a magnetic flux distributor, said non magnetic cylindrical flux distributor gap axially extending across said flange shaped magnetic legs of said magnetic circuit.

8. The electromagnetic rolling device of claim 7, wherein said magnetic shell comprises said radially outer cylinder only, and said non magnetic cylindrical flux distributor gap is disposed radial immediately over said magnetic core.

9. The electromagnetic rolling device of claim 7, wherein said non magnetic cylindrical flux distributor gap is variable in thickness in axial direction, and becomes thinner in a direction from said flange shaped magnetic legs to said non magnetic annular by-gap.

10. The electromagnetic rolling device of claim 7, wherein said non magnetic annular controlling gap is situated in said radially inner cylinder of said magnetic shell only, being at least twice as wide as said non magnetic cylindrical flux distributor gap.

11. The electromagnetic rolling device of claim 5, wherein said radially inner cylinder of said magnetic shell comprises massive ferromagnetic material.

12. The electromagnetic rolling device of claim 5, wherein said radially outer cylinder is made out of ferromagnetic strip shaped sheets or plates extending axially and being arranged side by side around the circumference of said roller with electrical isolation between them.

13. The electromagnetic rolling device of claim 5, wherein said electrical isolation between said annular disk shaped ferromagnetic sheets or plates of said radially outer cylinder is effected by annular disk shaped sheets selected from the group consisting of rubber and a polymer with comparable mechanical qualities, the outer diameter of said rubber sheets being greater than the outer diameter of said annular disk shaped ferromagnetic sheets or plates, said disk shaped annular sheets of rubber or of polymer forming the working coating of said rollers by their jutting part.

14. The electromagnetic rolling device of claim 1, wherein said flange shaped magnetic legs, at least in transitional areas leading to said magnetic core and to said radially inner cylinder of said magnetic shell respectively, are made out of ferromagnetic disk shaped annular sheets or plates being stacked together in the axial direction and electrically isolated from each another.

15. The electromagnetic rolling device of claim 1, wherein the nip gap is formed by a working rubber coating around each of said rollers, which has a relative magnetic permeability greater than 1 being effected by additions of ferromagnetic particles.

16. The electromagnetic rolling device of claim 1, wherein said rollers comprise several axially adjacent roller bodies, each of said roller bodies being fully capable to function by its own without any restriction, said magnetic cores of axially adjacent ones of said roller bodies respectively being magnetized in opposite direction.

17. The electromagnetic rolling device of claim 1, wherein said magnetic core is shaped as a hollow cylinder, the hollow cylindrical space of it being used for active or passive cooling of said rollers, and for carrying away Joule heat losses produced by the exciting current in said magnetizing coil.

18. The electromagnetic rolling device of claim 1, wherein in each case of said coil being rotating, power supply for magnetic field generation and control of the magnetic field as well, is provided via a common current path, comprising annular contact tracks and means for switching on and out of said controlling windings, said switching means being arranged within said rollers.

\* \* \* \* \*